Jan. 6, 1942.  F. H. BRUNER  2,269,250
ALKYLATION OF HYDROCARBONS
Filed May 11, 1939
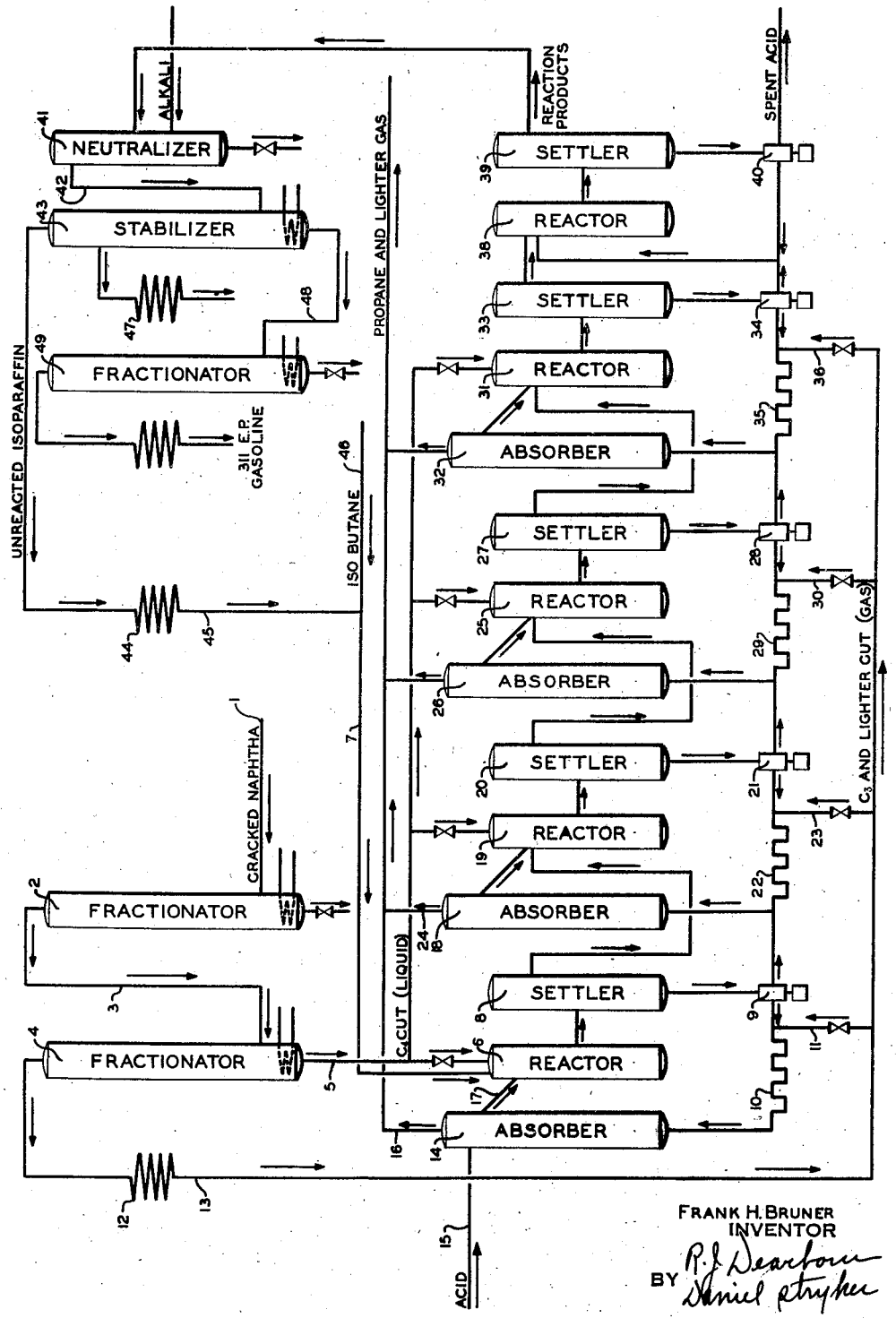
FRANK H. BRUNER
INVENTOR
BY
ATTORNEYS Patented Jan. 6, 1942

2,269,250

UNITED STATES PATENT OFFICE 2,269,250

ALKYLATION OF HYDROCARBONS

Frank H. Bruner, Beacon, N. Y., assignor, by mesne assignments, to The Texas Company, New York, N. Y., a corporation of Delaware Application May 11, 1939, Serial No. 273,072

16 Claims. (Cl. 196—10)

This invention relates to the alkylation of paraffin hydrocarbons with olefin hydrocarbons in the presence of a liquid catalyst, such as sulphuric acid, to produce high anti-knock hydrocarbons suitable for motor fuel.

The invention broadly contemplates a continuous method of alkylation wherein a hydrocarbon fraction containing isoparaffins and a liquid alkylation catalyst are passed to a reaction zone, or to a plurality of such zones arranged in stages, through which a substantial proportion of the catalyst is recycled, while normally gaseous olefin hydrocarbons are continuously injected in the recycled liquid as it returns to the reaction zone or zones.

The injected hydrocarbons may comprise in part normally gaseous paraffin hydrocarbons which do not enter into the reaction or are undesired. Therefore, the invention contemplates treating the recycled liquid containing injected gaseous hydrocarbons so as to remove these nonreactive or undesired paraffins from the system prior to returning the liquid to the reaction zone.

The alkylation catalyst comprises a liquid compound, such as concentrated sulphuric acid. However, it is contemplated that other liquid alkylation catalysts effective for the purpose may be used, such as may be prepared by passing BF$_3$ into water to complete saturation.

More specifically the invention comprises alkylating isoparaffin hydrocarbons with olefin hydrocarbons, including C$_3$ and C$_4$ olefins. This is accomplished by forming a hydrocarbon fraction comprising paraffin and olefin hydrocarbons having not less than four carbon atoms in the molecule and forming a separate fraction comprising C$_3$ and lower molecular weight hydrocarbons. This second fraction thus comprises propylene, propane, and lighter hydrocarbons.

The hydrocarbon fraction comprising C$_4$ and higher molecular weight hydrocarbons is subjected to contact with a liquid alkylation catalyst, such as concentrated sulphuric acid, in a reaction zone or stage maintained under pressure not substantially higher than that required to maintain the C$_4$ hydrocarbons in the liquid phase. A portion of the used catalyst is continuously withdrawn from a settler of the reaction stage and conducted to an absorption zone.

The C$_3$ and lower molecular weight hydrocarbon fraction in gaseous form is injected in the withdrawn liquid and maintained in contact with the liquid during passage through an absorption zone so that the olefin hydrocarbon constituents are absorbed from the gas by the catalyst. The unabsorbed hydrocarbons, such as propane, are discharged from the absorber while the liquid catalyst containing the absorbed olefin hydrocarbons is returned to the reaction stage.

According to a preferred method of operation, a plurality of reaction zones arranged in stages is employed. Streams of used catalyst are drawn off from each stage. A portion of the withdrawn catalyst is recycled to the same stage, while a portion of the withdrawn liquid may be conducted to a succeeding reaction stage. C$_3$ and lower molecular weight hydrocarbons are passed to each of a number of stages, being injected in the stream of used catalyst which is recycled to each stage.

One important object of the invention is the avoidance of maintaining pressures throughout the reaction stages substantially above those necessary to maintain the C$_4$ hydrocarbons in the liquid phase. In other words, by injecting the gaseous hydrocarbons, such as propylene, into a stream of recycling liquid catalyst it is unnecessary to employ a pressure sufficiently elevated to liquefy the C$_3$ hydrocarbons. Another object is to remove the inert hydrocarbons, such as propane, from the hydrocarbon mixture prior to introduction to the reaction zone.

The invention will be understood more fully upon reference to the following description read in connection with the accompanying drawing which comprises a diagrammatical sketch of flow suitable for practicing the process of the invention.

A hydrocarbon mixture, such as an unstabilized cracked naphtha, containing paraffin and olefin hydrocarbons suitable for alkylation is obtained from a source not shown and passed through a pipe 1 to a fractionator or stabilizer 2. A distillate fraction comprising C$_4$, C$_3$ and lighter hydrocarbons is removed as a distillate through a pipe 3, while the resulting stabilized naphtha is drawn off from the bottom of the fractionator 2.

The distillate fraction, which may contain substantial amounts of isoparaffin hydrocarbons, in addition to the olefins and normal paraffins, is passed to a fractionator 4, where the C$_3$ and lower molecular weight hydrocarbons, such as propylene, propane, ethylene, etc., are separated from the C$_4$ and higher molecular weight hydrocarbons that may be present.

The C$_4$ fraction is drawn off from the bottom of the fractionator through a pipe 5 and conducted to a reactor 6. It is brought into intimate contact with concentrated sulphuric acid within the reactor. Isobutane, including the portion being recycled, as will be explained later, is passed through a pipe 7 to the reactor 6. The liquid mixture from the reactor 6 overflows to a settler 8, wherein the used acid settles to the bottom. This used acid is drawn off by means of a pump 9 and at least a substantial portion thereof is passed to a mixing coil 10 wherein it is brought into contact with the $C_3$ and lighter hydrocarbons injected through a branch pipe 11. These gaseous hydrocarbons comprise the distillate fraction removed overhead from the fractionator 4 through a cooling coil 12 and a pipe 13, communicating with branch pipe 11.

The mixture from the mixing coil 10 passes to the lower portion of an absorber or absorption tower 14 and rises upwardly therethrough. Fresh sulphuric acid is introduced to the upper portion of the absorber 14 through a pipe 15. The unabsorbed hydrocarbons, such as propane, are discharged from the top of the absorber 14 through a pipe 16 containing a suitable relief valve to maintain the pressure within the absorber slightly higher than the $C_4$ pressure in the reactor 6. The acid containing the absorbed olefin hydrocarbons overflows from the absorber 14 through a pipe 17 to the reactor 6, thus coming into direct contact with the $C_4$ hydrocarbons and the recycled isoparaffin.

A portion of the used acid drawn off by the pump 9 may be conducted to an absorber 18 of the succeeding stage.

The hydrocarbon mixture accumulating in the upper portion of the settler 8 overflows to a reactor 19 of the succeeding stage and there comes into contact with the liquid mixture overflowing from the second-stage absorber 18. The overflow from reactor 19 passes to a settler 20 wherein used acid settles to the bottom. As described in connection with the preceding stage, the used acid is drawn off from the bottom of the settler 20 by a pump 21 and the desired portion thereof passed to a mixing coil 22 wherein it is brought into contact with a fresh gaseous hydrocarbon fraction injected from a branch pipe 23. The used acid containing the injected hydrocarbons passes upwardly through the absorber 18 from the top of which the unabsorbed hydrocarbon is discharged through a pipe 24.

Likewise, the hydrocarbon mixture flows from the upper portion of the settler 20 to a reactor 25 of a succeeding stage wherein it is brought into contact with acid and absorbed hydrocarbons overflowing from the third stage absorber 26. The liquid mixture flows from the reactor 25 to a settler 27. Used acid is drawn off from the bottom of the settler 27 by a pump 28 and passed through a mixing coil 29 to the absorber 26. Fresh $C_3$ hydrocarbon fraction is introduced to the coil 29 from a branch pipe 30.

The hydrocarbon mixture from the upper portion of the settler 27 flows to a reactor 31 wherein it is brought into contact with acid mixture overflowing from an absorber 32.

Again, used acid is drawn off from the bottom of a settler 33 by a pump 34 and passed to a mixing coil 35. Fresh gaseous hydrocarbon fraction is introduced through a branch pipe 36 and the resulting mixture passes to the absorber 32.

The hydrocarbon mixture from the upper portion of the settler 33 passes to a reactor 38 wherein the reaction is completed. The reacted mixture passes to a settler 39. The spent acid is drawn off from the bottom of the settler 39. Any desired portion, however, may be passed by a pump 40 to the preceding stage or recycled to the reactor 38.

As indicated, a portion of the used acid drawn off from the settlers in each stage may be conducted to the absorber of a succeeding stage. Also, as indicated, the fresh $C_4$ hydrocarbon fraction may be introduced to a plurality of the reactors.

The reaction product accumulating in the upper portion of the settler 39 is drawn off to a neutralizing vessel 41 wherein it may be neutralized by treatment with alkali. The neutralized product is drawn off through a pipe 42 to a stabilizer 43. In the stabilizer 43 the unreacted isoparaffin, i. e., isobutane, is removed overhead through a condenser 44 and returned through pipe 45, preferably to the first stage reactor 6. Additional isobutane may be required, in which case the makeup is added from a source not shown through a pipe 46.

If desired, a separate distillate fraction comprising normal butane may be removed as a side stream from the stabilizer 43 through a cooler 47. The higher-boiling hydrocarbons are drawn off from the bottom of the stabilizer 43 and passed through a pipe 48 to a fractionator 49. The fractionation in the fractionator 49 is controlled so as to produce a distillate fraction having a boiling range suitable for motor fuel or aviation gasoline; for example, the distillate may have an end boiling point of 311° F. to produce an aviation gasoline. The higher boiling hydrocarbons are drawn off from the bottom of the fractionator 49.

The sulphuric acid used as a catalyst is concentrated acid of about 88 to 100% $H_2SO_4$, and preferably of about 94 to 98% strength.

The temperature of reaction maintained in each stage may range from about 40 to 125° F., and preferably about 60 to 80° F. with a time of reaction from about 10 to 90 minutes and preferably about 20 to 60 minutes.

It is desirable to maintain an excess of isobutane in each reactor, for example, a ratio of isoparaffin to olefins of between about 3:1 and 5:1 or over. Lower ratios may be employed but usually in excess of 1:1.

The temperatures maintained in the absorbers may be approximately the same as those prevailing in the reaction zones, i. e., around 60 to 80° F.

While in describing the drawing reference has been made to a single hydrocarbon source for the $C_3$ and $C_4$ hydrocarbons, it is contemplated that the $C_4$ and $C_3$ fractions may be derived from different sources. The $C_3$ gaseous fraction may comprise substantially pure propylene or a gas consisting primarily of propylene.

Obviously many modifications and variations of the invention, as hereinbefore set forth, may be made without departing from the spirit and scope thereof and therefore only such limitations should be imposed as are indicated in the appended claims.

I claim:

1. A process for alkylating isoparaffin hydrocarbons with olefin hydrocarbons, including $C_4$ and $C_3$ olefins, which comprises subjecting a hydrocarbon fraction comprising olefins and paraffins having four and more carbon atoms per molecule, to contact with a liquid alkylation catalyst in the presence of an isoparaffin hydrocarbon in a reaction stage maintained under pressure sufficient to maintain $C_4$ hydrocarbons in the liquid phase, continuously withdrawing a stream of used catalyst from the reaction stage, injecting in said stream a $C_3$ and lighter hydrocarbon fraction comprising olefins and non-olefins such that olefins are absorbed and non-olefins rejected, removing the rejected hydrocarbons, and returning the stream containing absorbed olefins to the reaction stage.

2. The method according to claim 1 in which the alkylation catalyst comprises concentrated sulphuric acid.

3. A process for alkylating isoparaffin hydrocarbons with olefin hydrocarbons, including $C_4$ and $C_3$ olefins, the $C_3$ olefins being associated with other low molecular weight hydrocarbons, including propane, which comprises subjecting paraffin and olefin hydrocarbons, having not less than four carbon atoms in the molecule, to contact with a liquid alkylation catalyst in the presence of an isoparaffin hydrocarbon in a reaction stage maintained under pressure not substantially higher than required to maintain $C_4$ hydrocarbons in the liquid phase, continuously withdrawing a stream of used catalyst from the reaction stage, injecting $C_3$ olefin and associated hydrocarbons in said stream, passing the stream and injected hydrocarbons through an absorption zone wherein olefin constituents of the injected hydrocarbons are absorbed and other constituents rejected, removing the rejected constituents and returning the liquid containing absorbed hydrocarbons to the reaction stage.

4. The method according to claim 3 in which the reaction catalyst comprises concentrated sulphuric acid.

5. A method of alkylating isoparaffins with olefin hydrocarbons including $C_3$ and $C_4$ olefins, the $C_3$ olefins being associated with other low-boiling hydrocarbons, including propane, in the presence of a liquid alkylation catalyst, which comprises passing a hydrocarbon fraction containing isoparaffins and $C_4$ olefins through a series of reaction stages in contact with said catalyst, continuously withdrawing used catalyst from each reaction stage, continuously and separately conducting catalyst withdrawn from a plurality of said reaction stages through separate absorption zones, introducing $C_3$ olefin and associated hydrocarbons to each of said absorption zones, absorbing olefin hydrocarbons in the catalyst passing through said absorption zones, discharging unabsorbed hydrocarbons from the absorbers, and returning said catalyst containing absorbed olefins to the reaction stage from which it was withdrawn.

6. The method according to claim 5 in which the catalyst comprises concentrated sulphuric acid.

7. The method according to claim 5 in which a high ratio of isoparaffin to olefin is maintained in each stage.

8. A method of alkylation of isoparaffins with olefins including normally gaseous olefin hydrocarbons in the presence of a liquid alkylation catalyst which comprises passing a hydrocarbon fraction containing isoparaffins through a series of reaction stages in contact with said catalyst, passing substantially fresh catalyst to the first of said series of reaction stages, continuously and separately conducting catalyst withdrawn from a plurality of said reaction stages through separate absorption zones, introducing a gaseous hydrocarbon fraction containing olefins and saturated hydrocarbons to each of said absorption zones, absorbing olefin hydrocarbons in the catalyst passing through said absorption zones, discharging unabsorbed hydrocarbons from the absorption zones, returning said catalyst containing absorbed olefins to the reaction stage from which it was withdrawn, and passing a portion of the catalyst withdrawn from a preceding stage to the absorption zone of a succeeding stage.

9. A continuous process for alkylating isoparaffin hydrocarbons with olefin hydrocarbons, including $C_4$ and $C_3$ olefins and paraffins, which comprises subjecting a hydrocarbon fraction comprising olefins and paraffins having four and more carbon atoms per molecule to contact with a liquid alkylation catalyst in the presence of an isoparaffin hydrocarbon in a reaction zone, continuously withdrawing a portion of used catalyst from the reaction zone, continuously injecting a hydrocarbon fraction containing mainly olefin and paraffin hydrocarbons having less than four carbon atoms per molecule in the withdrawn catalyst such that olefin hydrocarbons are absorbed in the withdrawn catalyst and paraffin hydrocarbons are not absorbed, removing the unabsorbed hydrocarbons and returning the withdrawn catalyst containing absorbed hydrocarbons to the reaction zone.

10. The method according to claim 9 in which the alkylation catalyst comprises concentrated sulphuric acid.

11. A method of alkylating isoparaffin hydrocarbons with olefin hydrocarbons, including normally gaseous olefins, in the presence of a liquid alkylation catalyst which comprises passing a hydrocarbon fraction comprising paraffin and olefin hydrocarbons having four and more carbon atoms per molecule to a series of reaction chambers arranged so that treated hydrocarbons from each preceding chamber pass to the next succeeding chamber, subjecting the hydrocarbons to intimate contact with the catalyst in said chambers in the presence of an isoparaffin hydrocarbon, continuously and separately withdrawing streams of used catalyst from a plurality of said chambers, continuously injecting a hydrocarbon fraction containing mainly olefin and paraffin hydrocarbons having less than four carbon atoms per molecule in said streams such that olefin hydrocarbons are absorbed in the streams and paraffin hydrocarbons are not absorbed, removing the unabsorbed hydrocarbons and returning said streams containing absorbed hydrocarbons to the reaction chambers from which withdrawn.

12. The method according to claim 11 in which the catalyst is concentrated sulphuric acid.

13. In a process for alkylating isoparaffin hydrocarbons with olefin hydrocarbons, including $C_4$ and $C_3$ olefins, the steps comprising forming a hydrocarbon fraction containing paraffin and olefin hydrocarbons having four and more carbon atoms per molecule and a separate hydrocarbon fraction containing mainly olefin and paraffin hydrocarbons having less than four carbon atoms per molecule, subjecting the first-mentioned fraction to contact with a liquid alkylation catalyst in a zone of reaction in the presence of an isoparaffin hydrocarbon, continuously withdrawing a portion of used catalyst from said zone, subjecting the withdrawn catalyst to contact with said separate and more volatile hydrocarbon fraction, selectively absorbing olefins from said separate fraction in the withdrawn catalyst, rejecting the unabsorbed hydrocarbons from said separate fraction, and returning the withdrawn catalyst containing absorbed hydrocarbons to the reaction zone.

14. The method according to claim 13 in which the reaction catalyst comprises concentrated sulphuric acid.

15. A method of alkylation of isoparaffins with olefins including normally gaseous olefin hydrocarbons in the presence of a liquid alkylation catalyst which comprises passing a hydrocarbon fraction containing isoparaffins through a series of reaction stages in contact with said catalyst, continuously and separately withdrawing streams comprising used catalyst from a plurality of said reaction stages, conducting the withdrawn streams through separate absorption zones, introducing a hydrocarbon fraction comprising mainly normally gaseous olefin and paraffin hydrocarbons to each of said absorption zones, absorbing olefin hydrocarbons in the catalyst streams passing through said absorption zones, discharging unabsorbed hydrocarbons from the absorption zones, and continuously returning said catalyst streams containing absorbed olefins to the reaction stages.

16. The method according to claim 15 in which each returning catalyst stream containing absorbed olefins is returned to the same stage from which withdrawn.

FRANK H. BRUNER.